G. M. FOSTER.
FENDER FOR CULTIVATORS.
APPLICATION FILED FEB. 21, 1910.

972,842.

Patented Oct. 18, 1910.

2 SHEETS—SHEET 1.

G. M. FOSTER.
FENDER FOR CULTIVATORS.
APPLICATION FILED FEB. 21, 1910.
972,842.
Patented Oct. 18, 1910.
2 SHEETS—SHEET 2.
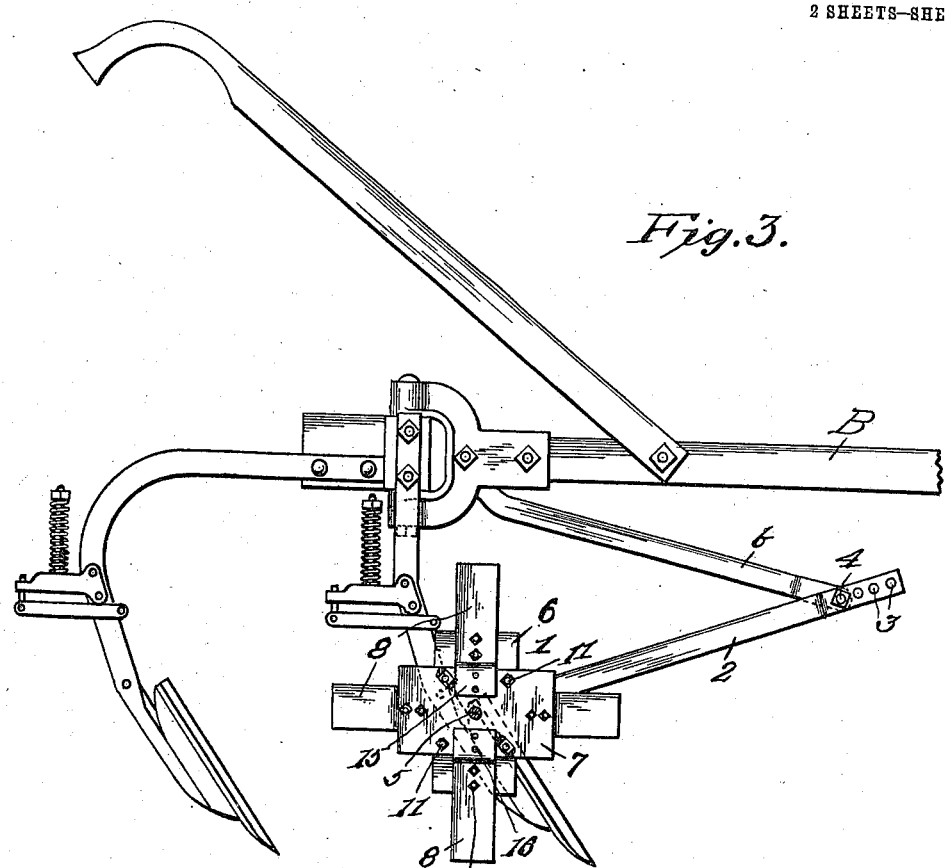
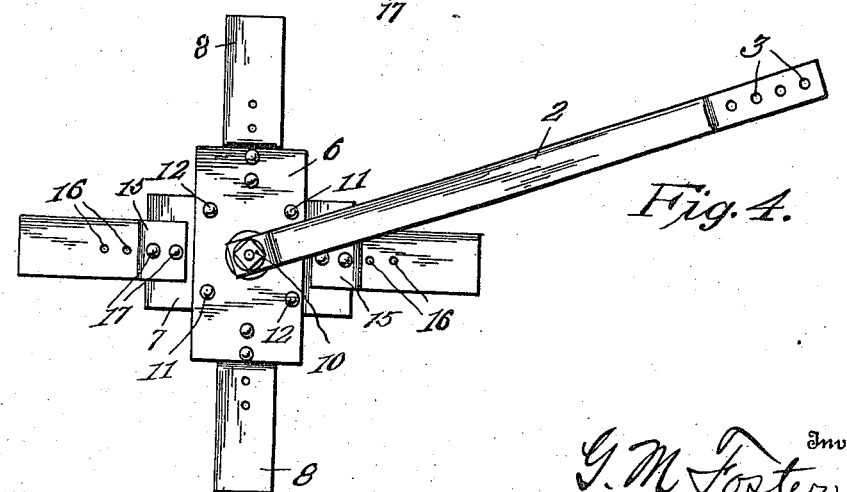

UNITED STATES PATENT OFFICE.

GEORGE M. FOSTER, OF BRYSON, TEXAS.

FENDER FOR CULTIVATORS.

972,842.  Specification of Letters Patent.  Patented Oct. 18, 1910.

Application filed February 21, 1910. Serial No. 545,108.

*To all whom it may concern:*

Be it known that I, GEORGE M. FOSTER, a citizen of the United States, residing at Bryson, in the county of Jack and State of Texas, have invented certain new and useful Improvements in Fenders for Cultivators, of which the following is a specification, reference being had to the accompanying drawings.

This invention relates to improvements in fenders for use on cultivators, cotton choppers and the like.

The object of the invention is to provide a simple and practical device of this character in the form of an attachment which may be readily applied to different agricultural implements or machines and which will be adjustable so that the blades or arms of the rotary fender wheel may be positioned closer to or farther from each other and may be caused to contact the ground at different distances.

With the above and other objects in view, the invention consists of the novel features of construction and the combination and arrangement of parts hereinafter fully described and claimed, and illustrated in the accompanying drawings, in which—

Figure 1:
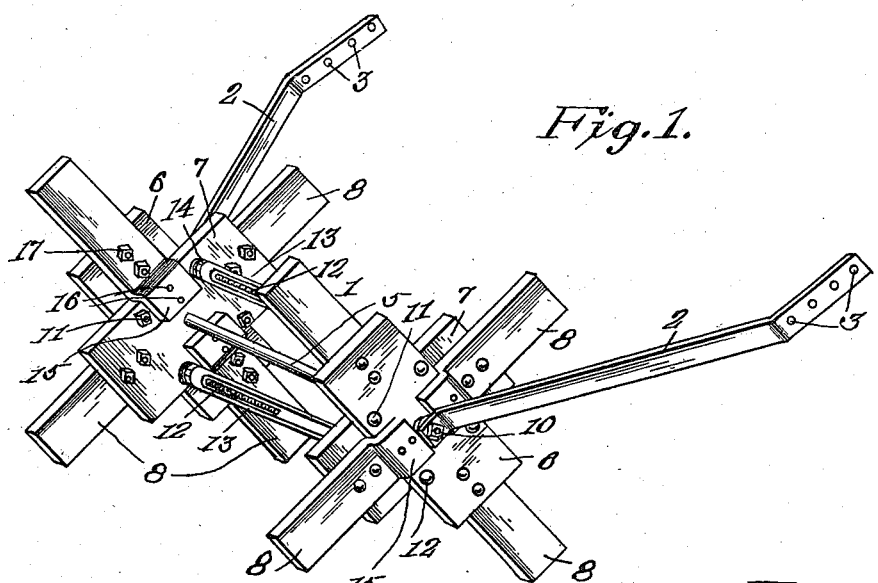
Figure 2:
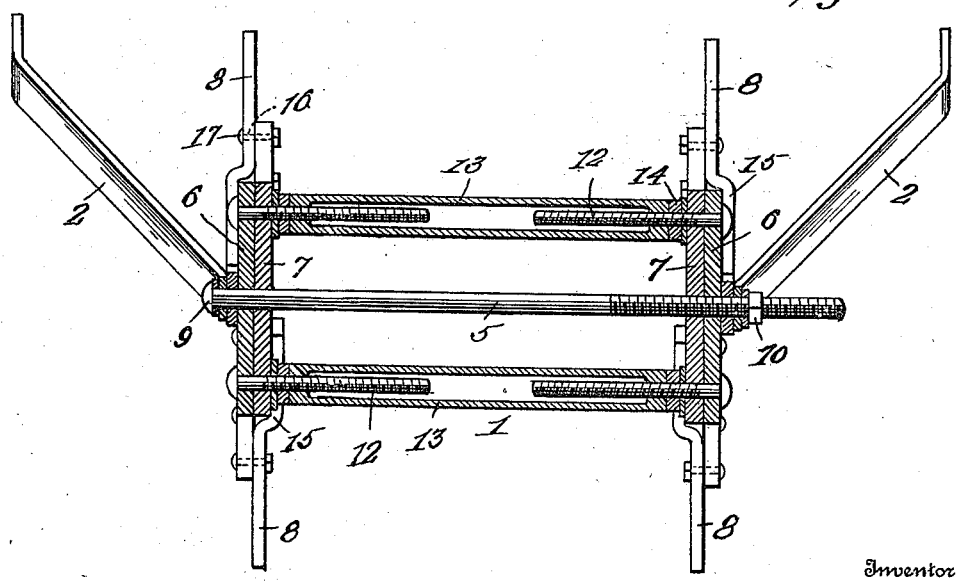

Figure 1 is a perspective view of the attachment; Fig. 2 is a longitudinal section through the rotary fender wheel; Fig. 3 is a detail transverse section through the same and showing it applied to a cultivator; and Fig. 4 is a side elevation of the attachment showing the fender arms or blades adjusted outwardly to lengthen them.

The invention comprises a rotary fender wheel 1 connected to the cultivator, cotton chopper or other implement by suitable hangers 2 so that it will run upon the ground and rotate by reason of the contact of its arms or blades with the ground. As illustrated, the hangers 2 are in the form of metal straps and their forward ends are preferably adjustably connected to the beams B of a cultivator or the like so that the wheel 1 is disposed between the two rows of shovels which operate on opposite sides of the row of plants. As illustrated in Fig. 3, the hangers 2 are formed with longitudinal series of apertures 3 any of which may receive pivot and fastening bolts 4 which pivotally connect the hangers 2 to arms or brackets *b* projecting from the beams B. The hanger straps 2 are inclined downwardly and converge rearwardly and their rear ends are apertured to receive a pivot or shaft 5 of the fender wheel 1.

The fender wheel 1 consists of two heads each of which consists of crossed plates 6, 7 to the projecting ends of which are adjustably secured fender blades or arms 8. The plates 6, 7 are formed with central apertures to receive the pivot 5, which latter is in the form of a large bolt having a head 9 at one end and an adjusting nut 10 on its other threaded end. The overlapped portions of the plates 6, 7 are formed with registering openings, certain ones of which receive fastening bolts 11 and others of which receive fastening and adjusting bolts 12. The latter are comparatively long and have their threaded inner ends oppositely screw threaded to receive comparatively long turn buckles 13. By providing the bolts 12 and turn buckles 13 the two heads of the fender wheel may be adjusted toward and from each other and they are rigidly connected in spaced relation. To prevent the bolts 12 from loosening in the plates 6, 7 when the turn buckles 13 are adjusted, clamping nuts 14 are arranged on the bolts 12 so as to hold the heads of the latter against the outer faces of said plates, as clearly shown in Fig. 2.

The fender blades or arms 8 are in the form of rectangular plates having offset ends 15 which may be engaged with the plates 6, 7 of the heads, as shown in Fig. 1 or as shown in Fig. 4. Said offset inner ends of the fender blades or arms 8 are apertured, as shown at 16, for the reception of fastening bolts 17 which pass through apertures in the projecting ends of the plates 6, 7. Owing to this construction, it will be seen that the blades 8 will be securely fastened to the head and may be adjusted radially thereon to cause the outer ends of said blades to contact the ground at different distances.

In operation, it will be seen that when the invention is applied to a cultivator or the like, as shown in Fig. 3, and the latter is drawn forwardly the fender wheel will be rotated by reason of the contact of its blades or arms 8 with the ground and when it is thus rotated said blades or arms will protect the plants from the earth thrown up by the shovels, disks, blades or other earth working elements of the cultivator or other implement to which the invention is applied. By reason of the adjustment of the hangers 2 the wheel may be adjusted forwardly or rearwardly with respect to the cultivator or the like and by reason of the adjustment of the heads of the wheels toward and from each other and the radial adjustment of the fender blades or arms the device may be adapted for operating over different kinds of plants.

While I have shown and described the invention as applied to a cultivator I wish it understood that it may be used in connection with any kind of agricultural implement or machine and that it may be applied to such machines without disturbing the construction of the same.

While the preferred embodiment of the invention has been shown and described in detail, it will be understood that various changes in the form, proportion and arrangement of parts and in the details of construction may be resorted to without departing from the spirit or scope of the invention.

Having thus described the invention what is claimed is:

1. A device of the character described comprising a shaft, hangers at the ends of said shaft, a rotatable fender wheel on said shaft, said wheel having spaced heads, and means for adjusting said heads toward and from each other.

2. A device of the character described comprising a shaft, hangers at the ends of said shaft, a rotatable fender wheel on said shaft, said wheel having spaced heads composed of crossed plates, the latter being formed with openings, fender arms formed with longitudinal series of openings adapted to be placed in alinement with the openings in said crossed plates, and fastenings arranged in said alining openings to adjustably connect said fender arms to the plates.

3. A device of the character described comprising a shaft, hangers at the ends of said shaft, a rotatable fender wheel on said shaft, said wheel having spaced heads, said heads being slidable on said shaft, and turn buckles adjustably connecting said heads.

4. A device of the character described comprising a shaft, hangers for the latter, a rotatable fender wheel on said shaft, said wheel having spaced heads, means for adjusting said heads toward and from each other and fender blades or arms radially adjustable on said heads.

5. A device of the character described comprising a shaft, hangers for the latter, a rotatable fender wheel on said shaft, said wheel having spaced heads, turn buckles adjustably connecting said heads and radially extending fender blades or arms connected to said heads.

6. A device of the character described comprising a shaft, hangers for the latter, a rotatable fender wheel on said shaft, said wheel having spaced heads consisting of crossed plates, adjustable connections between said heads, fender blades or arms having offset apertured inner ends to engage the crossed plates of said heads and fastenings arranged in the apertures of said blades or arms and adjustably securing the latter to the plates of said heads.

7. The combination with an implement, of swinging hangers, means for adjustably pivoting the latter to said implement, and a rotary fender wheel carried by said hangers and having radially extending fender blades or arms adapted to contact with the ground.

In testimony whereof I hereunto affix my signature in the presence of two witnesses.

GEORGE M. FOSTER.

Witnesses:
S. E. NICHELS,
J. B. SIMPSON.